United States Patent
Zhong et al.

(10) Patent No.: US 12,233,534 B2
(45) Date of Patent: Feb. 25, 2025

(54) ROBOT

(71) Applicant: FANUC CORPORATION, Yamanashi (JP)

(72) Inventors: Tingting Zhong, Yamanashi (JP); Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/260,742

(22) PCT Filed: Apr. 20, 2021

(86) PCT No.: PCT/JP2021/016079
§ 371 (c)(1),
(2) Date: Jul. 7, 2023

(87) PCT Pub. No.: WO2022/224358
PCT Pub. Date: Oct. 27, 2022

(65) Prior Publication Data
US 2024/0058969 A1    Feb. 22, 2024

(51) Int. Cl.
*B25J 19/04*     (2006.01)
*B25J 13/08*     (2006.01)

(52) U.S. Cl.
CPC ............. *B25J 13/08* (2013.01); *B25J 19/04* (2013.01)

(58) Field of Classification Search
CPC ........ B25J 19/023; B25J 9/1674; B25J 19/04; B25J 13/08; G05B 2219/40584; G05B 2219/40607
See application file for complete search history.

(56) References Cited

U.S. PATENT DOCUMENTS

| | | | |
|---|---|---|---|
| 10,766,136 B1 * | 9/2020 | Porter | G06N 3/045 |
| 10,766,137 B1 * | 9/2020 | Porter | G06N 3/04 |

(Continued)

FOREIGN PATENT DOCUMENTS

| | | |
|---|---|---|
| JP | 2004-306249 A | 11/2004 |
| JP | 2005-334998 A | 12/2005 |

(Continued)

OTHER PUBLICATIONS

Iwasaki et al., Construction of a compact range image sensor using a multi-slit laser projector suitable for a robot hand, 2012, IEEE, p. 4517-4523 (Year: 2012).*

(Continued)

*Primary Examiner* — McDieunel Marc
(74) *Attorney, Agent, or Firm* — Studebaker & Brackett PC

(57) ABSTRACT

Provided is a robot capable of automatically confirming the accuracy of a three-dimensional sensor and correcting the accuracy. The robot comprises: a three-dimensional sensor; a notification unit for notifying a determination timing for determining a deviation of an optical system of the three-dimensional sensor, on the basis of a change in a physical quantity related to the three-dimensional sensor; and a determination unit for determining whether or not there is a deviation at the optical system of the three-dimensional sensor. The change in the physical quantity includes at least one of acceleration and the number of times of acceleration and deceleration added to the three-dimensional sensor, a change in temperature of the three-dimensional sensor within a certain period, a change in temperature of the three-dimensional sensor within a total operating period, and the number of times of change in temperature of the three-dimensional sensor within the total operating period.

7 Claims, 3 Drawing Sheets

(56) References Cited

U.S. PATENT DOCUMENTS

| | | | |
|---|---|---|---|
| 10,792,810 B1 * | 10/2020 | Beckman | B25J 9/163 |
| 10,800,040 B1 * | 10/2020 | Beckman | B25J 9/1605 |
| 2023/0390936 A1 * | 12/2023 | Mizohana | B25J 9/1697 |

FOREIGN PATENT DOCUMENTS

| | | | |
|---|---|---|---|
| JP | 2006-035384 A | 2/2006 |
| JP | 2015-042437 A | 3/2015 |
| JP | 2015-089575 A | 5/2015 |
| JP | 2017-040549 A | 2/2017 |
| JP | 2017-042895 A | 3/2017 |
| JP | 2020-172015 A | 10/2020 |
| JP | 6803633 B1 | 12/2020 |

OTHER PUBLICATIONS

Boochs et al., Increasing the accuracy of untaught robot positions by means of a multi-camera system, 2010, IEEE, p. 1-9 (Year: 2010).*

Habib et al., Fiber-Grating-Based Vision System for Real-Time Tracking, Monitoring, and Obstacle Detection, 2007, IEEE, p. 105-121 (Year: 2007).*

Leutert et al., Leutert et al., 3D-Sensor Based Dynamic Path Planning and Obstacle Avoidance for Industrial Manipulators, 2012, IEEE, p. 92-97 (Year: 2012).*

International Search Report issued in PCT/JP2021/016079; mailed Jul. 13, 2021.

* cited by examiner

ROBOT

TECHNICAL FIELD

The present invention relates to a robot.

BACKGROUND ART

There is an application that uses a stereo-type three-dimensional sensor mounted to a robot or secured to a trestle in order to measure, inter alia, a shape or position and orientation of a target object and for the robot to perform work with respect to the target object.

The three-dimensional sensor is typically provided with a plurality of two-dimensional cameras. In order to obtain correct three-dimensional information, the three-dimensional sensor is used after an optical system is calibrated at a time of factory shipment or when used. Accordingly, when the optical system belonging to the three-dimensional sensor changes from the time of calibration due to, inter alia, deterioration over time, vibration, acceleration/deceleration by the robot, or a greater than expected impact being applied thereto, problems such as being unable to obtain correct three-dimensional information or accuracy worsening occur.

For example, techniques such as those in Patent Documents 1 and 2 have been proposed as techniques for detecting an anomaly in a three-dimensional sensor. A three-dimensional position measuring device described in Patent Document 1 determines deviation by cameras from parallax calculated using block matching, displays an alarm when an anomaly is detected, and resets a parameter. An information processing device described in Patent Document 2 diagnoses a stereo camera by comparing a plane obtained by solving kinematics with measured three-dimensional information.

Patent Document 1: Japanese Unexamined Patent Application, Publication No. 2017-040549

Patent Document 2: Japanese Unexamined Patent Application, Publication No. 2004-306249

DISCLOSURE OF THE INVENTION

Problems to be Solved by the Invention

However, the above-described Patent Documents 1 and 2 do not disclose automatic accuracy confirmation and accuracy correction for a three-dimensional sensor. For example, in a case where a distance between two-dimensional cameras has changed, it ceases to be possible to measure a correct distance. In addition, in a case where a relative position of a two-dimensional camera has deviated in a direction orthogonal to an inter-camera direction, it ceases to be possible to obtain three-dimensional information in the first place. Accordingly, a maintenance function that checks for deviation in an optical system belonging to a three-dimensional sensor at a certain interval, and automatically recalibrates in a case where there is an anomaly is required.

Means for Solving the Problems

A robot according to one aspect of the present disclosure is provided with: a three-dimensional sensor that captures an image of a target object; a notification unit that notifies a determination timing for, based on fluctuation of a physical quantity relating to the three-dimensional sensor, determining deviation in an optical system belonging to the three-dimensional sensor; and a determination unit that determines whether deviation in the optical system belonging to the three-dimensional sensor has arisen, the fluctuation of the physical quantity including at least one of a number of times the robot operates, a number of times the robot takes out a target object, a number of times the three-dimensional sensor captures an image, a number of times acceleration or deceleration is applied to the three-dimensional sensor, a change in temperature of the three-dimensional sensor within a certain time period, a change in temperature of the three-dimensional sensor within a total operating time period, or a number of changes in temperature by the three-dimensional sensor within the total operating time period.

Effects of the Invention

By virtue of the present invention, it is possible to automatically perform accuracy confirmation and correction of the accuracy, for a three-dimensional sensor.

PREFERRED MODE FOR CARRYING OUT THE INVENTION

Figure 1A:
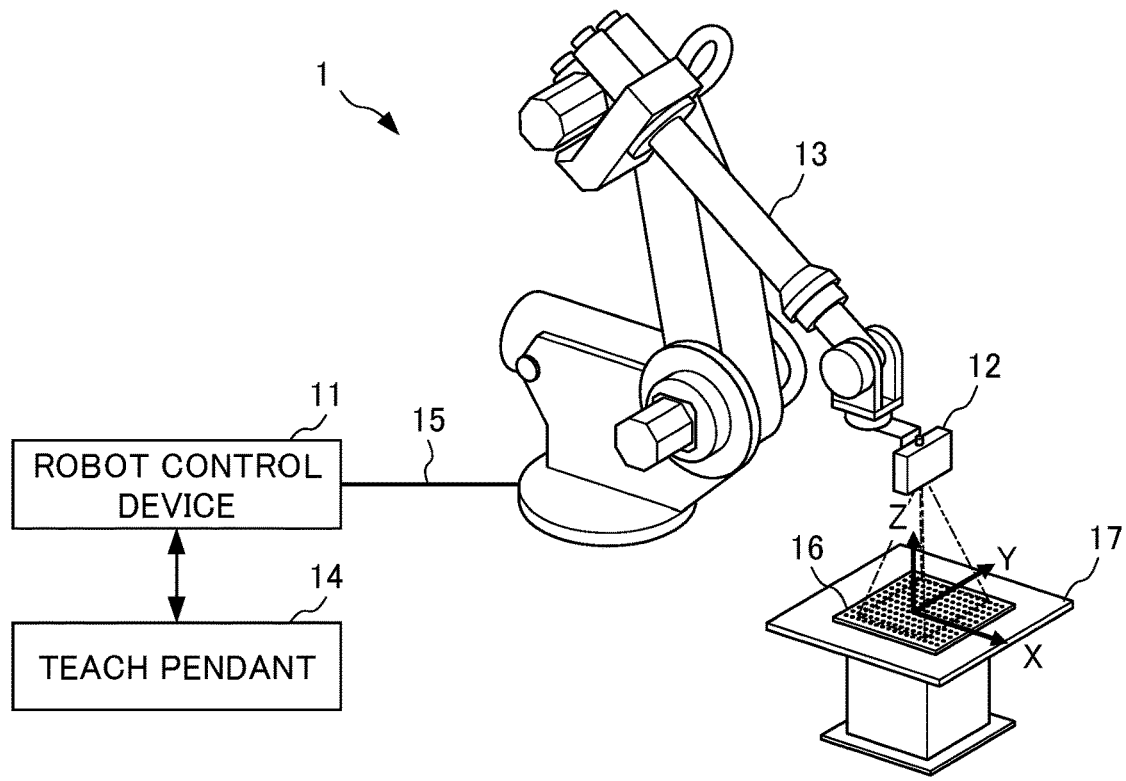
FIG. 1A is a block view that illustrates a configuration of a robot according to the present embodiment.
Figure 1B:
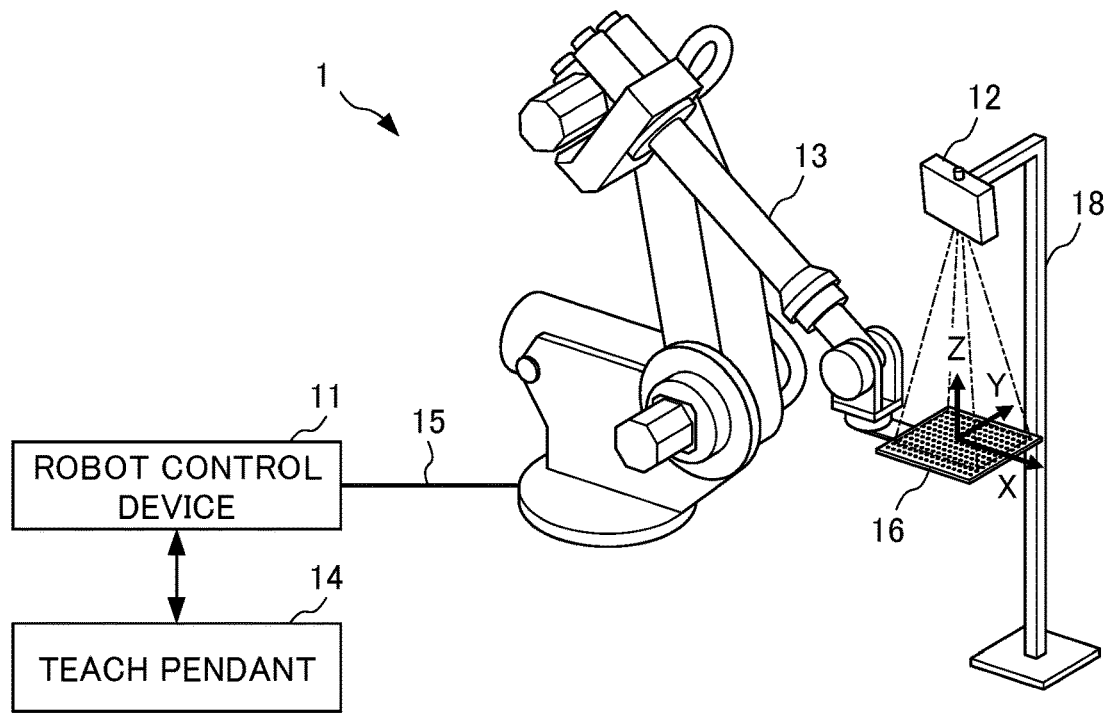
FIG. 1B is a block view that illustrates a configuration of the robot according to the present embodiment.

Description is given below regarding an example of an embodiment according to the present invention. FIGS. 1A and 1B is are block views that illustrate configurations of a robot 1 according to the present embodiment. As illustrated in FIG. 1A and FIG. 1B, the robot 1 is provided with a robot control device 11, a three-dimensional sensor 12, a robot mechanism 13, and a teach pendant 14.

The robot control device 11 is connected to the robot mechanism 13 via a cable 15, and is also connected to the teach pendant 14 by wired or wireless communication. The robot control device 11 controls operation of the entirety of the robot 1.

The three-dimensional sensor 12 is connected to the robot control device 11 by wired or wireless communication. The three-dimensional sensor 12 has an image capturing element such as a CCD (Charge-Coupled Device) image sensor or a CMOS (Complementary Metal-Oxide-Semiconductor) image sensor, for example. The three-dimensional sensor 12 may be provided with a projector and detect a three-dimensional shape of a target object to be captured using ToF (Time of Flight). The three-dimensional sensor 12 may also use two image capturing elements to detect a three-dimensional shape of a target object to be captured in accordance with the parallax therebetween. In this manner, the three-dimensional sensor 12 generates a three-dimensional image that indicates a three-dimensional shape of a target object to be captured, and obtains three-dimensional information. The three-dimensional sensor 12 is also provided with, inter alia, a temperature sensor or a thermometer, and can measure an internal temperature thereof.

The robot mechanism 13 is provided with, a body, an articulated arm, a hand, and the like, and, inter alia, machines, grasps, and conveys a workpiece, in accordance with control by the robot control device 11.

The teach pendant 14 is connected to the robot control device 11, and is used by an operator in order to operate the robot 1. For example, the teach pendant 14 is provided with an input unit configured by, inter alia, a key for teaching an operation to the robot 1 and a display unit for displaying, inter alia, a command for a taught operation or an image captured by the three-dimensional sensor 12.

As illustrated in FIG. 1A, the three-dimensional sensor 12 may be mounted to a tip portion of the robot mechanism 13. The three-dimensional sensor 12 captures a dot pattern belonging to a dot pattern fixture 16 disposed on a base 17, and obtains three-dimensional information. The robot control device 11 uses obtained three-dimensional information to measure deviation in an optical system, and uses the measured deviation in the optical system to correct (calibrate) the optical system.

In addition, as illustrate in FIG. 1B, the three-dimensional sensor 12 may be secured to a support body 18. The dot pattern fixture 16 is grasped by the robot mechanism 13. The three-dimensional sensor 12 captures a dot pattern belonging to the dot pattern fixture 16 grasped by the robot mechanism 13, and obtains three-dimensional information. The robot control device 11 uses obtained three-dimensional information to measure deviation in an optical system, and uses the measured deviation in the optical system to correct (calibrate) the optical system.

Figure 2:
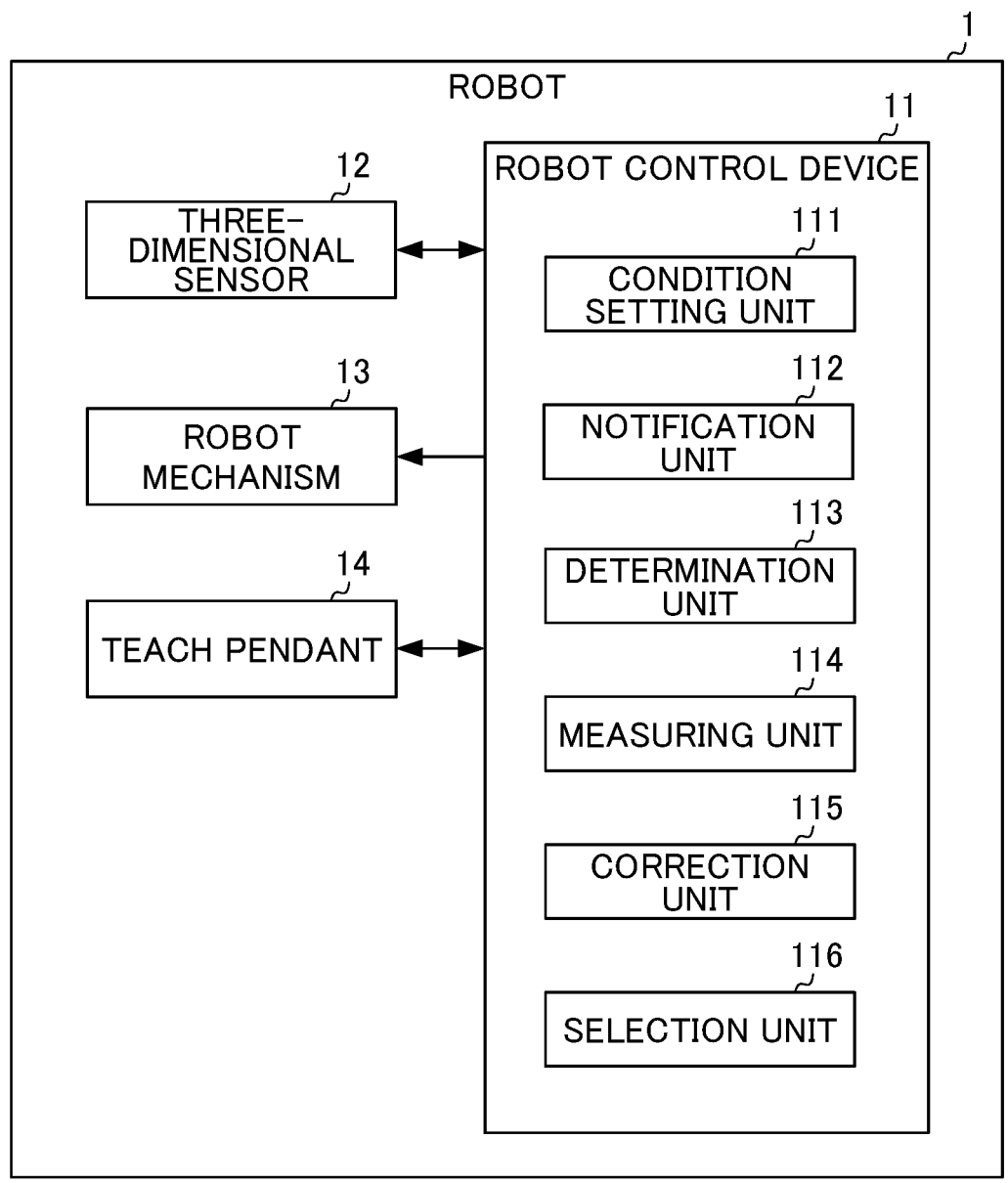
FIG. 2 is a block view that illustrates a functional configuration of the robot according to the present embodiment.

FIG. 2 is a block view that illustrates a functional configuration for the robot 1 according to the present embodiment. As illustrated in FIG. 2, the robot 1 is provided with the robot control device 11, the three-dimensional sensor 12, the robot mechanism 13, and the teach pendant 14. The robot control device 11 is provided with a condition setting unit 111, a notification unit 112, a determination unit 113, a measuring unit 114, a correction unit 115, and a selection unit 116.

The condition setting unit 111 presets a determination condition for determining deviation in the optical system belonging to the three-dimensional sensor 12. The determination condition includes a number of times a later-described physical quantity relating to the three-dimensional sensor 12 fluctuates. For example, the determination condition includes, inter alia, a number of times the robot 1 operates, a number of times the robot 1 takes out a target object, a number of times the three-dimensional sensor 12 captures an image, a number of times acceleration or deceleration is applied to the three-dimensional sensor 12, a level of a change in temperature of the three-dimensional sensor 12 within a certain time period, a level of a change in temperature of the three-dimensional sensor 12 within a total operating time period, and a number of changes in temperature by the three-dimensional sensor 12 within the total operating time period.

Based on fluctuation of a physical quantity relating to the three-dimensional sensor 12, the notification unit 112 notifies the determination unit 113 of a determination timing for determining deviation in the optical system belonging to the three-dimensional sensor 12.

Specifically, when fluctuation of a physical quantity relating to the three-dimensional sensor 12 satisfies the preset determination condition, the notification unit 112 notifies the determination unit 113 of a determination timing for determining deviation in the optical system belonging to the three-dimensional sensor 12.

Fluctuation of a physical quantity relating to the three-dimensional sensor 12 includes at least one of a number of times the robot 1 operates, a number of times the robot 1 takes out a target object, a number of times the three-dimensional sensor 12 captures an image, a number of times acceleration or deceleration is applied to the three-dimensional sensor 12, a change in temperature of the three-dimensional sensor 12 within a certain time period, a change in temperature of the three-dimensional sensor 12 within a total operating time period, or a number of changes in temperature by the three-dimensional sensor 12 within the total operating time period.

In particular, the optical system belonging to three-dimensional sensor 12 is easily impacted by a change in temperature. Therefore, it is desirable for the fluctuation of a physical quantity by the three-dimensional sensor 12 to include at least one of the change in temperature of the three-dimensional sensor 12 within a certain time period, the change in temperature of the three-dimensional sensor 12 within the total operating time period, or the number of changes in temperature by the three-dimensional sensor 12 within the total operating time period.

Note that a change in temperature of the three-dimensional sensor 12 within a certain time period may be a change in temperature of the three-dimensional sensor 12 within 24 hours, for example. Regarding change in temperature of the three-dimensional sensor 12 within the total operating time period, it may be that the total operating time period is one year and the changes in temperature are within the range of 1-40° C., for example. In addition, for the number of changes in temperature, a change in temperature of 10° C. or more may arise a predetermined number of times during one instance while a power supply for the three-dimensional sensor 12 is on, for example.

The determination unit 113, upon being notified of a determination timing from the notification unit 112, determines whether deviation in the optical system belonging to the three-dimensional sensor 12 has arisen.

Specifically, the determination unit 113 determines whether deviation in the optical system belonging to the three-dimensional sensor 12 has arisen by employing a number of three-dimensional points for a target object or a measurement distance to the target object as an evaluation index. In more detail, upon being notified of a determination timing from the notification unit 112, the determination unit 113 uses the three-dimensional sensor 12 to obtain three-dimensional information regarding a target object having a known distance or a target object having a known shape, such as the above-described dot pattern fixture 16.

When the difference between an obtained value and a value for the known shape or known distance exceeds a threshold or when the number of three-dimensional points in obtained three-dimensional information is equal to or less than a threshold, the determination unit 113 determines that the accuracy of the three-dimensional sensor 12 has decreased and that deviation in the optical system belonging to the three-dimensional sensor 12 has arisen.

In a case where the three-dimensional sensor 12 has two image capturing elements (two-dimensional cameras), the three-dimensional sensor 12 typically ceases to be able to measure a correct distance when the positional relationship between the two two-dimensional cameras fluctuates from a time of adjustment.

For example, in a case where an inter-camera distance between the two-dimensional cameras has fluctuated due to, inter alia, a change in temperature of the optical systems within the two-dimensional cameras or an impact or vibration generated by the robot 1 (deviation in a horizontal direction), the three-dimensional sensor 12 ceases to be able to measure a correct distance.

In addition, in a case where the two-dimensional cameras have deviated in a direction orthogonal to the inter-camera distance (deviation in a vertical direction), there are cases where the three-dimensional sensor 12 ceases to be able to obtain three-dimensional information that includes distance. In a case where deviation in the horizontal direction or the vertical direction has arisen in the optical system belonging to the three-dimensional sensor 12 in this manner, the robot 1 uses the measuring unit 114 and the correction unit 115 to measure and correct deviation in the optical system.

In a case where the determination unit 113 has determined that deviation has arisen in the optical system belonging to the three-dimensional sensor 12, the measuring unit 114 executes an adjustment program and measures deviation in the optical system.

The correction unit 115 uses the measured deviation in the optical system to correct the optical system. Specifically, the correction unit 115 can, based on the measured deviation in the optical system, use software to correct an image captured by the three-dimensional sensor 12 and thereby obtain correct three-dimensional information.

The robot 1 may also select whether to make a determination by the determination unit 113. Specifically, in addition to the determination unit 113, the notification unit 112 also notifies a determination timing to the selection unit 116. Upon being notified of the determination timing from the notification unit 112, the selection unit 116 selects whether to make a determination unit 113 by the determination unit 113.

For example, the selection unit 116 selects, in accordance with an operation by an operator with respect to the teach pendant 14, whether to make a determination by the determination unit 113. As a result, the robot 1 can discretionarily select a determination regarding deviation in the optical system belonging to the three-dimensional sensor 12. For example, it is possible to make it such that the selection unit 116 makes it such that a determination for deviation in the optical system belonging to the three-dimensional sensor 12 is not performed in a case where an operator has determined that there is no need to determine deviation in the optical system belonging to the three-dimensional sensor 12, even if the selection unit 116 is notified of a determination timing.

Figure 3:
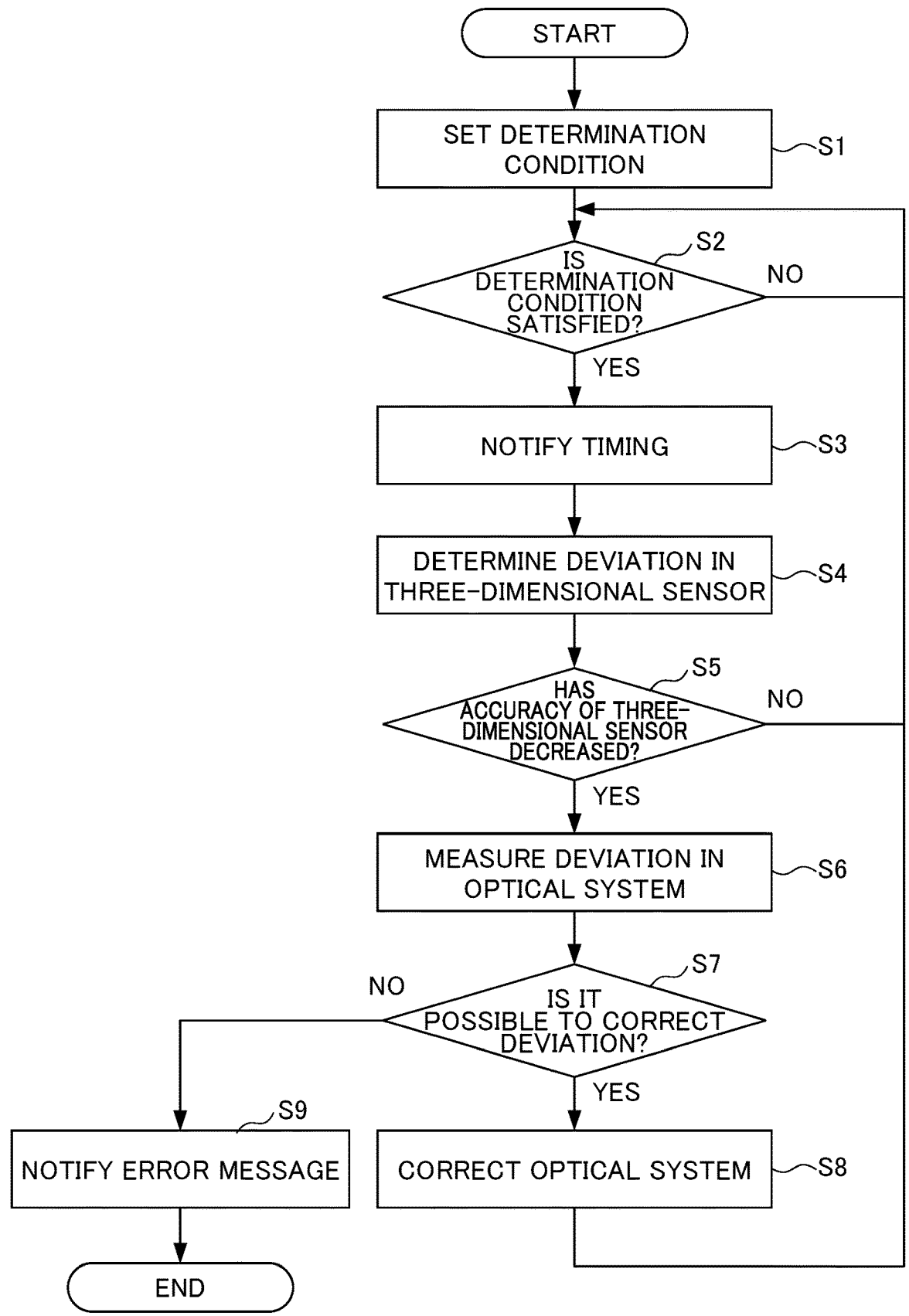
FIG. 3 is a flow chart that illustrates processing by the robot according to the present embodiment.

FIG. 3 is a flow chart that illustrates a flow of processing by the robot 1 according to the present embodiment. In Step S1, the condition setting unit 111 sets in advance a determination condition for determining deviation in the optical system belonging to the three-dimensional sensor 12.

In Step S2, the notification unit 112 determines whether fluctuation of a physical quantity relating to the three-dimensional sensor 12 satisfies a preset determination condition. In a case of satisfying the determination condition (YES), the processing transitions to Step S3. In contrast, in a case of not satisfying the determination condition (NO), the processing transitions to Step S2 again.

In Step S3, the notification unit 112 notifies the determination unit 113 of a determination timing for determining deviation in the optical system belonging to the three-dimensional sensor 12. In Step S4, the determination unit 113, upon being notified of a determination timing from the notification unit 112, determines whether deviation in the optical system belonging to the three-dimensional sensor 12 has arisen.

In Step S5, in a case where it is determined that accuracy for the three-dimensional sensor 12 has decreased and deviation in the optical system belonging to the three-dimensional sensor 12 has arisen (YES), the processing transitions to Step S6. In contrast, in a case where it is determined that deviation in the optical system belonging to the three-dimensional sensor 12 has not arisen (NO), the processing transitions to Step S2.

In Step S6, the measuring unit 114 executes the adjustment program and measures deviation in the optical system belonging to the three-dimensional sensor 12.

In Step S7, in a case where the correction unit 115 can correct the deviation measured in Step S6 (YES), the processing transitions to Step S8. In contrast, in a case where the correction unit 115 cannot correct the measured deviation because the amount of deviation in the optical system belonging to the three-dimensional sensor 12 is too large (NO), the processing transitions to Step S9.

In Step S8, the correction unit 115 uses the measured deviation in the optical system to correct the optical system.

In Step S9, in a case where the correction unit 115 was not able to correct the deviation in the optical system belonging to the three-dimensional sensor 12, the robot control device 11 notifies an error message to the teach pendant 14, and a display unit in the teach pendant 14 displays the error message.

By virtue of the present embodiment, the robot 1 is provided with: the three-dimensional sensor 12 that captures an image of a target object; the notification unit 112 that notifies a determination timing for, based on fluctuation of a physical quantity relating to the three-dimensional sensor 12, determining deviation in an optical system belonging to the three-dimensional sensor 12; and a determination unit 113 that determines whether deviation in the optical system belonging to the three-dimensional sensor 12 has arisen, the fluctuation of the physical quantity including at least one of a number of times the robot 1 operates, a number of times the robot 1 takes out a target object, a number of times the three-dimensional sensor 12 captures an image, a number of times acceleration or deceleration is applied to the three-dimensional sensor 12, a change in temperature of the three-dimensional sensor 12 within a certain time period, a change in temperature of the three-dimensional sensor 12 within a total operating time period, or a number of changes in temperature of the three-dimensional sensor 12 within the total operating time period.

In this manner, the robot 1 notifies a timing for determining deviation in the optical system belonging to the three-dimensional sensor 12 and checks for deviation in the three-dimensional sensor 12, whereby it is possible to prevent stopping the robot 1 due to a decrease in accuracy for the three-dimensional sensor 12. In addition, in a case where correction of the optical system belonging to the three-dimensional sensor 12 has become necessary, the robot 1 can automatically measure deviation in the optical system and automatically correct the optical system belonging to the three-dimensional sensor 12 based on the deviation, whereby maintaining the three-dimensional sensor 12 is facilitated.

In addition, the fluctuation of the physical quantity includes at least one of the change in temperature of the three-dimensional sensor 12 within the certain time period, the change in temperature of the three-dimensional sensor 12 within the total operating time period, or the number of changes in temperature of the three-dimensional sensor 12 within the total operating time period. As a result, the robot 1 can notify a determination timing for determining deviation in the optical system in the three-dimensional sensor 12, based on fluctuation of a physical quantity that is likely to be impacted by accuracy of the three-dimensional sensor 12.

In addition, the notification unit 112 notifies the determination timing to the determination unit 113 when a preset determination condition is satisfied. As a result, the robot 1 can execute, at an appropriate timing, a determination regarding deviation in the optical system belonging to the three-dimensional sensor 12.

In addition, the determination unit 113 determines whether deviation in the optical system has arisen by employing a number of three-dimensional points for a target object or a measurement distance to the target object as an evaluation index. As a result, the robot 1 can use an appropriate evaluation index to determine whether there is deviation in the optical system belonging to the three-dimensional sensor 12.

In addition, the robot 1 is also provided with the condition setting unit 111 for setting a determination condition. As a result, the robot 1 can appropriately set a determination condition for determining fluctuation of a physical quantity relating to the three-dimensional sensor 12.

In addition, the robot 1 is also provided with the selection unit 116 which, when a determination timing is notified thereto, selects whether to make a determination using the determination unit 113. As a result, the robot 1 can discretionarily select a determination regarding deviation in the optical system belonging to the three-dimensional sensor 12.

In addition, the robot 1 is also provided with the measuring unit 114 which measures deviation in the optical system, and the correction unit 115 which uses the measured deviation in the optical system to correct the optical system. As a result, in a case where correction of the optical system belonging to the three-dimensional sensor 12 has become necessary, the robot 1 can automatically measure deviation in the optical system and automatically correct the optical system belonging to the three-dimensional sensor 12 based on the deviation, whereby maintaining the three-dimensional sensor 12 is facilitated.

Description was given above regarding embodiments of the present invention, but the robot 1 described above can be realized by hardware, software, or a combination of these. A control method performed by the robot 1 described above can be realized by hardware, software, or a combination of these. Being realized by software means being realized by a computer reading and executing a program.

A program can be stored using various types of non-transitory computer-readable mediums and supplied to a computer. A non-transitory computer-readable medium includes various types of tangible storage mediums. An example of a non-transitory computer-readable medium includes a magnetic recording medium (for example, a hard disk drive), a magneto-optical recording medium (for example, a magneto-optical disk), a CD-ROM (read-only memory), CD-R, CD-R/W, and a semiconductor memory (for example, a mask ROM, a programmable ROM (PROM), an erasable PROM (EPROM), a flash ROM, or a random-access memory (RAM)).

Each embodiment described above is a suitable embodiment of the present invention, but the scope of the present invention is not limited to only the embodiments described above, and the present invention can be worked in forms resulting from making various modifications within a range that does not deviate from the substance of the present invention.

EXPLANATION OF REFERENCE NUMERALS

1 Robot
11 Robot control apparatus
12 Three-dimensional sensor
13 Robot mechanism
14 Teach pendant
111 Condition setting unit
112 Notification unit
113 Determination unit
114 Measuring unit
115 Correction unit
116 Selection unit

The invention claimed is:

1. A robot, comprising:
a three-dimensional sensor configured to capture an image of a target object;
a notification unit configured to notify a determination timing for, based on fluctuation of a physical quantity relating to the three-dimensional sensor, determining deviation in an optical system belonging to the three-dimensional sensor; and
a determination unit configured to determine whether deviation in the optical system belonging to the three-dimensional sensor has arisen,
wherein the fluctuation of the physical quantity includes at least one of a number of times the robot operates, a number of times the robot takes out a target object, a number of times the three-dimensional sensor captures an image, a number of times acceleration or deceleration is applied to the three-dimensional sensor, a change in temperature of the three-dimensional sensor within a certain time period, a change in temperature of the three-dimensional sensor within a total operating time period, or a number of changes in temperature by the three-dimensional sensor within the total operating time period.

2. The robot according to claim 1, wherein the fluctuation of the physical quantity includes at least one of the change in temperature of the three-dimensional sensor within the certain time period, the change in temperature of the three-dimensional sensor within the total operating time period, or the number of changes in temperature by the three-dimensional sensor within the total operating time period.

3. The robot according to claim 1, wherein the notification unit notifies the determination timing when a preset determination condition is satisfied.

4. The robot according to claim 1, wherein the determination unit determines whether deviation in the optical system has arisen by employing a number of three-dimensional points for a target object or a measurement distance to the target object as an evaluation index.

5. The robot according to claim 3, further comprising:
a condition setting unit configured to set the determination condition.

6. The robot according to claim 1, further comprising:
a selection unit configured to select whether to make a determination using the determination unit when the determination timing is notified.

7. The robot according to claim 1, further comprising:
a measuring unit configured to measure deviation in the optical system, and
a correction unit configured to correct the optical system using the measured deviation in the optical system.

* * * * *